United States Patent
Yamamoto et al.

(10) Patent No.: US 6,367,698 B1
(45) Date of Patent: Apr. 9, 2002

(54) BAR CODE READER FOR DECODING A FOUR STATE BAR CODE

(75) Inventors: Atsuharu Yamamoto, Kawasaki; Mikio Fujita, Yokohama, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/527,849

(22) Filed: Mar. 17, 2000

(30) Foreign Application Priority Data

Jun. 28, 1999 (JP) .......................................... 11-181569

(51) Int. Cl.[7] ................................................. G06K 7/10
(52) U.S. Cl. ............................. 235/462.11; 235/462.25; 235/462.41
(58) Field of Search ....................... 235/462.01, 462.11, 235/462.14, 462.24, 462.25, 462.32, 462.41

(56) References Cited

U.S. PATENT DOCUMENTS

| | | | | |
|---|---|---|---|---|
| 4,874,936 A | * | 10/1989 | Chandler et al. | 235/494 |
| 5,399,846 A | * | 3/1995 | Pavlidis et al. | 235/462.01 |
| 5,504,320 A | * | 4/1996 | Adachi | 235/463 |
| 6,170,749 B1 | * | 1/2001 | Goren et al. | 235/462.01 |

FOREIGN PATENT DOCUMENTS

| EP | 0667592 | * | 8/1995 | G06K/19/06 |
|---|---|---|---|---|
| JP | 2-125386 | | 5/1990 | |

* cited by examiner

*Primary Examiner*—Michael G. Lee
*Assistant Examiner*—Daniel St. Cyr
(74) *Attorney, Agent, or Firm*—Connolly Bove Lodge & Hutz LLP

(57) ABSTRACT

A bar code reader which is suitable for decoding a four-state bar code such as a Postnet bar code and which is designed to extract a bar code correctly from a background in a captured image. The bar code reader includes a binary coding circuit transforming a captured image into a binary image, an image storage storing therein the binary image, a shrinking circuit shrinking each pattern in the binary image by k pixels, a vertical expansion circuit expanding each pattern in the image outputted from the shrinking circuit vertically by m pixel, an edge detector detecting a contour of each pattern in the image outputted from the vertical expansion circuit to produce an image containing an edge of each pattern, a horizontal expansion circuit expanding each pattern in the image outputted from the edge detector horizontally by n1 pixel, a horizontal contraction circuit contracting each pattern in the image outputted from the horizontal expansion circuit horizontally by n2, an identification circuit labeling patterns in the image outputted from the horizontal contraction circuit to identify the patterns, and a decoder. The identification circuit specifies a bar code area based on shape characteristics of the patterns. The decoder selects data on the image stored in the image storage which belongs in the bar code area specified by the identification circuit to decode the bar code.

6 Claims, 16 Drawing Sheets

| d4 | d3 | d2 |
|----|----|----|
| d5 | d0 | d1 |
| d6 | d7 | d8 |

FIG. 9

FEATURE TABLE

| AREA NUMBER | TOTAL NUMBER OF x COORDINATES | TOTAL NUMBER OF y COORDINATES | NUMBER s | CENTER xg | CENTER yg |
|---|---|---|---|---|---|
| 1 | X(1) | Y(1) | s(1) | xg(1) | yg(1) |
| 2 | X(2) | Y(2) | s(2) | xg(2) | yg(2) |
| ------ | ------ | ------ | ------ | ------ | ------ |
| i | X(i) | Y(i) | s(i) | xg(i) | yg(i) |
| ------ | ------ | ------ | ------ | ------ | ------ |

FIG. 12

ORIGINAL IMAGE FEATURE TABLE

| AREA NUMBER | TOTAL NUMBER OF x COORDINATES | TOTAL NUMBER OF y COORDINATES | NUMBER s | CENTER xg | CENTER yg | FLAG |
|---|---|---|---|---|---|---|
| 1 | X(1) | Y(1) | s(1) | xg(1) | yg(1) | 1 |
| 2 | X(2) | Y(2) | s(2) | xg(2) | yg(2) | 1 |
| ------ | ------ | ------ | ------ | ------ | ------ | ------ |
| i | X(i) | Y(i) | s(i) | xg(i) | yg(i) | 1 |
| ------ | ------ | ------ | ------ | ------ | ------ | ------ |

FIG. 13

GROUP TABLE

| ITEMS | CONTENTS |
|---|---|
| j | SERIAL GROUP NUMBER |
| bar_flag | [1] INDICATES A CANDIDATE FOR A BAR CODE<br>[0] INDICATES A NON-CANDIDATE FOR A BAR CODE |
| NL | TOTAL NUMBER OF LANDS IN A GROUP |
| x [0]<br>y [0]<br>s [0]<br>bar [0] | x COORDINATES OF CENTER OF LAND<br>y COORDINATES OF CENTER OF LAND<br>SIZE OF LAND<br>TYPE OF BAR |
| x [1]<br>y [1]<br>s [1]<br>bar [1] | x COORDINATES OF CENTER OF LAND<br>y COORDINATES OF CENTER OF LAND<br>SIZE OF LAND<br>TYPE OF LAND |
| ⋮ | |
| x [NL−1]<br>y [NL−1]<br>s [NL−1]<br>bar [NL−1] | x COORDINATES OF CENTER OF LAND<br>y COORDINATES OF CENTER OF LAND<br>SIZE OF LAND<br>TYPE OF LAND |

BAR CODE READER FOR DECODING A FOUR STATE BAR CODE

BACKGROUND OF THE INVENTION

1. Technical Field of the Invention

The present invention relates generally to a bar code reader designed to determine the position and orientation of a bar code in a captured image of a document such as postal matter on which characters etc. are printed for decoding the bar code correctly.

2. Background Art

Bar codes are in widespread use as a means carrying information on management of articles in marketing, distribution, and production processes. Such bar codes are typically read out by a portable scanner such as a hand-held scanner and a pen-input scanner designed to scan a bar code directly by an operator or a stationary scanner designed to sweep a plurality of light beams in different directions to read a bar code through at least one of the light beams scanning the bar code correctly. A decoding system is also known which captures a two-dimensional image of a target object and extracts a bar code area from the image through image processing to decode a bar code. This system has the advantage of decoding a bar code correctly regardless of position and orientation of the bar code and even if a plurality of different bar codes are also printed on a target object. Japanese Patent First Publication No. 02-125386 teaches a bar code-reading system using a two-dimensional image which is shown in FIG. 17.

An image from an input device 901 is transformed into a binary data through a binary coding circuit 903. The binary data is transformed by an edge detector 904 into a bar contour image and inputted to a black expansion circuit 905. The black expansion circuit 905 fuses contours of bars of the bar code in the inputted image to produce a smeared bar code area in the image. A black contraction circuit 906 contracts black patterns smaller than a given size to delete characters etc. in the background of the inputted image and extracts the bar code area. A bar code axis determining circuit 907 defines a bar code axis line passing through the bar code area. A readout coordinate determining circuit 908 reads an image data out of an image memory 902 based on the bar code axis line. A decoder 909 decodes the bar code contained in the image data read out of the image memory 902 regardless of the position and orientation of the bar code in the image.

However, in a case of a bar code such as a Postnet bar code or an RM4SC (i.e., a 4-state code) made up of short bars substantially equal in length to that of characters printed near the bar code, a drawback is encountered in that the deletion of the patterns in the background of the image through the black contraction circuit 906 may cause the bar code area to be also deleted from the image. In order to avoid this problem, the degree to which the black patterns are shrunk may be decreased, but it may also lead to a problem that the characters are left in the background, thereby making it difficult to extract the bar code area only.

SUMMARY OF THE INVENTION

It is therefore a principal object of the present invention to avoid the disadvantages of the prior art.

It is another object of the present invention to provide a bar code reader designed to extract a bar code area from a background of a captured image correctly even if a bar code is made up of a relatively short bars such as a 4-state bar for decoding the bar code with high reliability.

According to one aspect of the invention, there is provided a bar code reader which comprises: (a) an image capturing device capturing an image containing a bar code; (b) a binary coding circuit transforming the image captured by the image capturing device into a binary image in which a background is expressed in a binary 0, and each pattern is expressed in a binary 1; (c) an image storage storing therein the binary image produced by the binary coding circuit; (d) a shrinking circuit shrinking each pattern in a binary image outputted from the binary coding circuit by k pixels (k is a positive integral number) from a background side; (e) a vertical expansion circuit expanding each pattern in a binary image outputted from the shrinking circuit vertically by m pixel (m is a positive integral number); (f) an edge detector detecting a contour of each pattern in a binary image outputted from the vertical expansion circuit to produce a binary image containing an edge of each pattern in the inputted binary image; (g) a horizontal expansion circuit expanding each pattern in the binary image outputted from the edge detector horizontally by n1 pixel (n1 is a positive integral number); (h) a horizontal contraction circuit contracting each pattern in a binary image outputted from the horizontal expansion circuit horizontally by n2 (n2 is a positive integral number); (i) an identification circuit labeling patterns in a binary image outputted from the horizontal contraction circuit to identify the patterns, the identification circuit specifying a bar code area based on shape characteristics of the patterns; and (j) a decoder selecting data on the binary image stored in the image storage which belongs in the bar code area specified by the identification circuit to decode the bar code in the image captured by the image capturing device.

In the preferred mode of the invention, the bar code reader may further includes (a) a horizontal expansion circuit expanding each pattern in the binary image outputted from the shrinking circuit horizontally by the m pixel, (b) an edge detector detecting a contour of each pattern in a binary image outputted from the horizontal expansion circuit to produce a binary image containing an edge of each pattern in the inputted binary image, (c) a vertical expansion circuit expanding each pattern in the binary image outputted from the edge detector vertically by the n1 pixel, (d) a vertical contraction circuit contracting each pattern in a binary image outputted from the vertical expansion circuit vertically by the n2, and (e) an OR circuit logically oring outputs from the horizontal contraction circuit and the vertical contraction circuit to provide an output to the identification circuit.

The identification circuit determines one of a size, a peripheral length, and a circumscribed rectangle of each pattern in the image outputted from the horizontal contraction circuit as a feature of each pattern and specifies the bar code area based on the features of the patterns.

The identification circuit may alternatively determines the feature of each pattern in the image inputted from one of the horizontal contraction circuit and the vertical contraction circuit through the OR circuit.

The bar code contained in the image captured by the image capturing device may be a four-state bar code made up of a combination of long bars, semilong bars, and timing bars. The identification circuit identifies each pattern in the binary image outputted from the horizontal contraction circuit as one of the long bar, the semilong bar, and the timing bar, determines a line passing through centers of the patterns identified as the semilong bar, determines whether a center of each of the patterns identified as the semilong bar lies on a firs side of the line or a second side opposed to the first side to find a positional relation between each of the patterns identified as the semilong bar and the line, and decodes the bar code using the positional relation.

The identification circuit may alternatively identify each pattern in the binary image inputted from one of the horizontal contraction circuit and the vertical contraction circuit through the OR circuit as one of the long bar, the semilong bar, and the timing bar.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 9 shows a feature table listing features of patterns in a captured image;

FIG. 12 shows an original image feature table;

FIG. 13 shows a group table;

DESCRIPTION OF THE PREFERRED EMBODIMENTS

Figure 1:
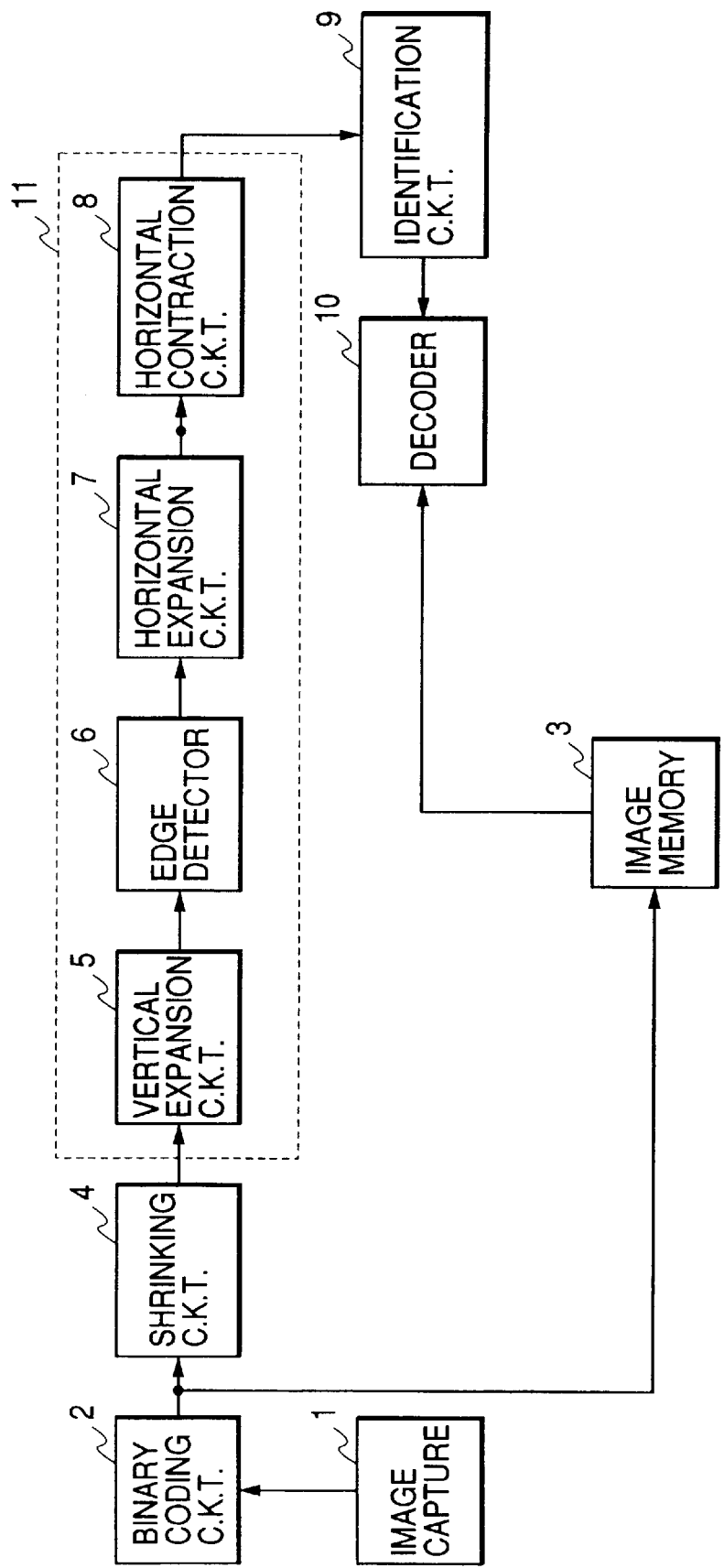
FIG. 1 is a block diagram which shows a bar code reader according to the present invention.

Referring now to the drawings, wherein like numbers refer to like parts in several views, particularly to FIG. 1, there is shown a bar code reader according to the present invention which is designed to extract a bar code such as a four-state code made up of a combination of relatively short bars from a background of a captured image.

The bar code reader generally includes an image capture 1, a binary coding circuit 2, an image memory 3, a shrinking circuit 4, an identification circuit 9, a decoder 10, and a horizontal extraction circuit 11.

The image capture 1 captures an image of a bar code-printed document and outputs bit-mapped image signals to the binary coding circuit 2. The binary coding circuit 2 transforms some of the image signals representing patterns into binary 1s and the others representing a background into binary 0s to produce a binary image. The image memory 3 stores therein the binary image produced by the binary coding circuit 2. The shrinking circuit 4 shrinks the patterns in the binary image inputted from the binary coding circuit 2 by k pixels.

The horizontal extraction circuit 11 consists of a vertical expansion circuit 5, an edge detector 6, a horizontal expansion circuit 7, and a horizontal contraction circuit 8. The vertical expansion circuit 5 expands each pattern in the binary image vertically by m pixels. The edge detector 6 detects edges in the binary image to find the contours of the patterns. The horizontal expansion circuit 7 expands the patterns in the binary image horizontally by n1 pixels. The horizontal contraction circuit 8 contracts the patterns horizontally by n2 pixels.

The identification circuit 9 labels the patterns in the binary image based on pattern shape characteristics to identify a bar code area. The decoder 10 reads image data on the bar code area identified by the identification circuit 9 out of the image memory 3 to decode a bar code contained in the image picked up by the image capture 1.

Figures 2, 3:
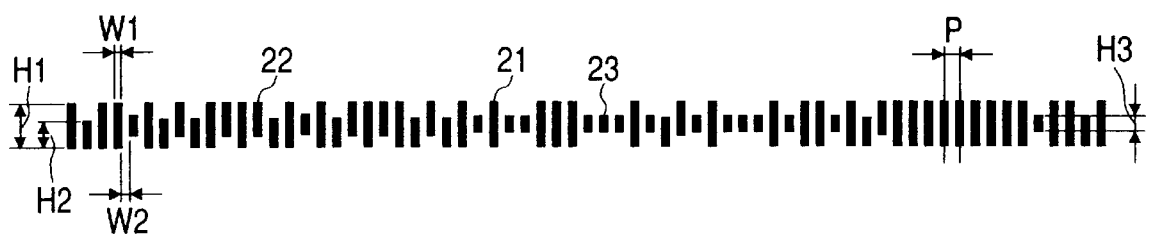
FIG. 2 shows a 4-state bar code read out by a bar code reader of the invention.
FIG. 3 shows a scanning window defined by a matrix of 3×3 pixels in a captured image.

FIG. 2 shows one example of bar codes handled by the bar code reader of this embodiment.

The shown bar code is the so-called 4-state code used in Postnet system etc. and consists of long bars 21, semilong bars 22, and timing bars 23. The long bars 21 have the height H1 of 3.6 mm. The timing bars 23 have the height H3 of 1.2 mm. The bar width W1 and the bar space W2 are 0.6 mm. The bar pitch P is 1.2 mm. The semilong bars 22 are, as can be seen in the drawing, located either on an upper side or a lower side of a longitudinal center line of the bar code. Specifically, the bar code is made up of a combination of four types of bar: the long bars 21, the timing bars 23, the upper semilong bars 22, and the lower semilong bars 22 to exhibit four states.

The operation of the bar code reader of this embodiment will be discussed below in more detail.

The image capture 1 includes a linear CCD camera and is designed to irradiate a bar code-printed document using a daylight fluorescent lamp to capture an image of the document in a density of about 8 lines/mm. The binary coding circuit 2 codes the image inputted from the image capture 1 into a binary image using a fixed threshold value in which each character and a bar code printed on the document are expressed in a binary 1 and a background in a binary 0. Such binary coding is well known in the art, and explanation thereof in detail will be omitted here. The thus binary-coded image is inputted to the shrinking circuit 4 and the image memory 3.

FIG. 3 shows a scanned window made up of a matrix of 3×3 pixels used in determining whether a target pixel is to be deleted or not in an image-shrinking operation performed in the shrinking circuit 4.

In the image-shrinking operation, binary values of 8 neighboring pixels d1 to d8 surrounding a target pixel d0 are first checked to determine whether the binary value of the target pixel d0 is to be changed from 1 to 0 or not. The shrinking operation is an action to erase the periphery of each pattern in a captured image such as a bar code on a pixel basis from a background side to reduce the size of the pattern to a dot ultimately, which may be achieved, like thinning, by deleting the pattern in units of pixel while keeping the connectivity of the pattern and which is different from the thinning in that ends of a segment are deleted while leaving an isolated dot represented by one pixel as it is.

In order to avoid undesirable elimination of a picture having a two-pixel width, the deletion of one peripheral layer (i.e., the outermost array of pixels) of each pattern in the image is accomplished with two scans. Specifically, in the first scan, an upper array and a right array of pixels of the pattern are deleted by changing the binary value of each target pixel from 1 to 0 if a condition, as shown below, is met.

$$\{(d1=0) \text{ or } (d3=0)\} \text{ and}$$

$$\left(\sum_{i=1}^{8} di \cdot \overline{di+1} = 1\right)$$

if $i=8$, then $i+1=1$

In the second scan, a lower array and a left array of pixels of the pattern are deleted by changing the binary value of each target pixel from 1 to 0 if a condition, as shown below, is met.

$$\{(d5=0) \text{ or } (d7=0)\} \text{ and}$$

$$\left(\sum_{i=1}^{8} di \cdot \overline{di+1} = 1\right)$$

if $i=8$, then $i=1=1$

A set of the above two scans are repeated k times to thin each pattern in the image inwardly by k pixels. In this embodiment, they are performed 10 times to thin the pattern to the extent that the timing bars 23 of the bar code are each almost reduced in size to one dot.

Figure 4A:
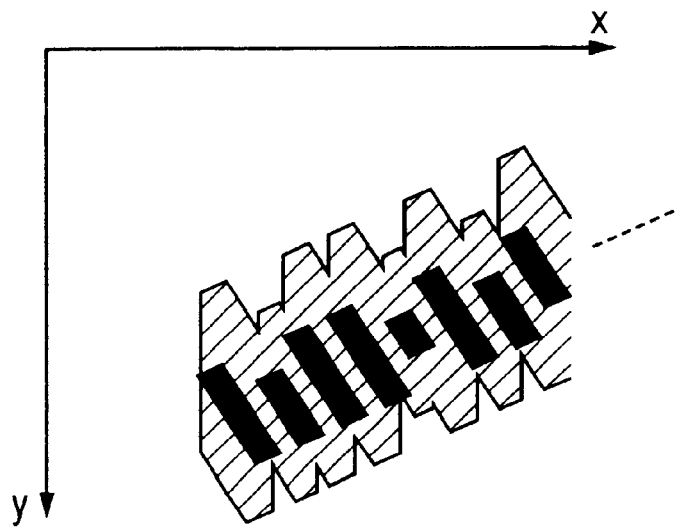
FIG. 4(a) shows a bar code expanded vertically without being shrunk when it is skewed.
Figure 4B:
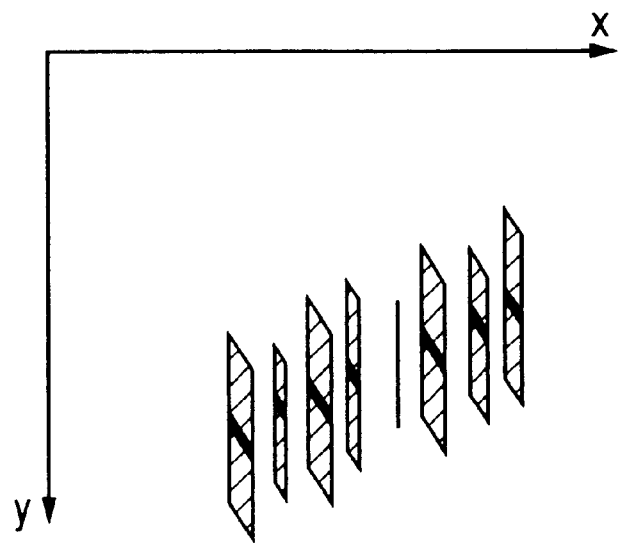
FIG. 4(b) shows a bar code expanded vertically after being shrunk when it is skewed.

The vertical expansion circuit 5 enlarges the shrunk pattern in a vertical direction. Specifically, the vertical expansion circuit 5 extends the bar code in a heightwise direction (i.e., a lengthwise direction of each bar or direction perpendicular to a scan direction) to emphasize the periodicity of the bar code. The reason whey the shrinking operation is performed prior to the vertical expansion operation of the vertical expansion circuit 5 is because when a bar code is, as shown in FIG. 4(a), skewed, vertical expansion of the bar code without being shrunk will cause, as shown by hatching, areas between adjacent bars to be smeared or blacked so that all the bars are connected, thereby resulting in elimination of the periodicity that is the feature of the bar code. In contrast, the vertical expansion of the bar code after being shrunk by the shrinking circuit 4 allows all the bars to be enlarged vertically, as shown in FIG. 4(b), without being overlapped with each other, thus keeping the periodicity of the bar code.

Figure 5:
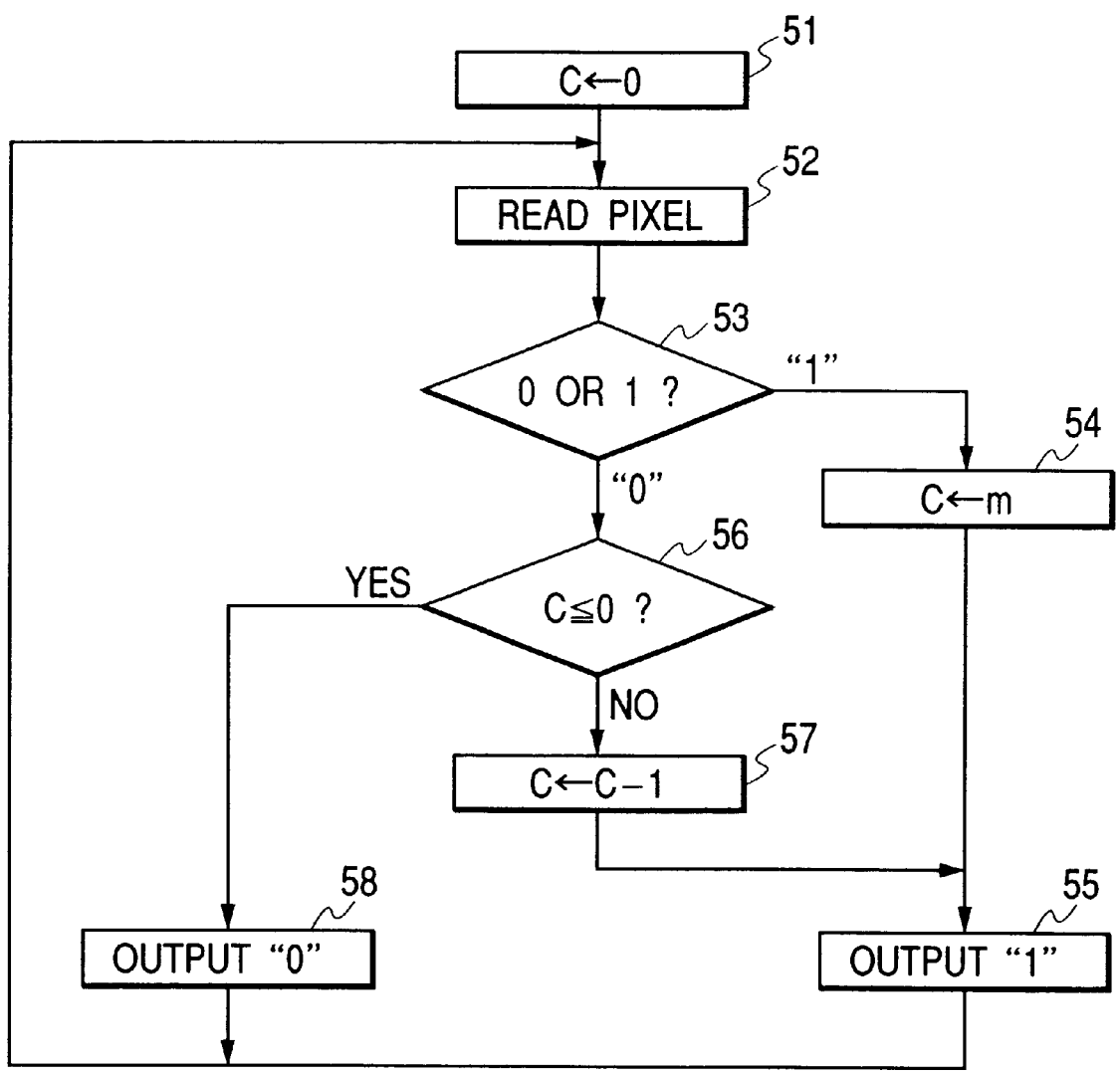
FIG. 5 is a flowchart of a program performed by a vertical expansion circuit.

FIG. 5 shows a program or sequence of logical steps performed by the vertical expansion circuit 5 to scan the binary image from left to right in units of a vertical line to increase a vertical run-length of consecutive 1s by m pixels.

After entering the program, the routine proceeds to step 51 wherein a count value C indicating the run-length or number of consecutive 0s is reset to zero (0) at the start of a scan of each line.

The routine proceeds to step 52 wherein data of a first one of pixels on one of the lines is picked up. The routine proceeds to step 53 wherein it is determined whether the value of the pixel is zero (i.e., a white pixel) or one (i.e., a black pixel). If the value is zero, then the routine proceeds to step 56. Alternatively, if the value is one, then the routine proceeds to step 54 wherein the count value C is set to m. The routine proceeds to step 55 wherein the scanned pixel is judged to exist on a black run, and one (1) is outputted as the value of the pixel scanned in this program cycle.

In step 56, it is determined whether the count value C is smaller than or equal to zero (0) or not. If a NO answer is obtained meaning that the count value C is greater than zero, then the routine proceeds to step 57 wherein the count value C is decremented by one and proceeds to step 55. Alternatively, if a YES answer is obtained, then the routine proceeds to step 58 wherein the pixel scanned in this program cycle is judged to lie at an interval of more than m pixels away from the original black run, and the value of zero (0) is outputted. After step 58 or 55, the routine returns back to step 52 to repeat the above described operations until an end of the line is reached, thereby prolonging the black run on the line by m pixels.

Subsequently, steps 51 to 58 are performed again to lengthen a back run of the next line vertically.

Accordingly, upon completion of scans over the whole of the image, the black run-length of each vertical line is increased by m pixels.

The operation of the edge detector 6 will be described with reference to FIG. 3.

The raster scanning is performed from the upper left side to the lower right side of the inputted image. The pixels are, in sequence, defined as the center of a window such as the one shown in FIG. 3 to execute an operation, as shown below, on the pixels in the window.

$$do \cdot (d1+d3+d5+d7) \cdot \overline{(d1 \cdot d3 \cdot d5 \cdot d7)}$$

where + indicates the OR operation, and · indicates the AND operation.

The result of the operation represents a brightness change position of each pattern in the image and produces an 8-connected edge.

The operation of the horizontal expansion circuit 7 will be described below.

The horizontal expansion circuit 7 performs the function of enlarging the contour of each pattern (i.e., each edge detected by the edge detector 6) horizontally by n1 pixels for smearing spaces between the bars of the bar code. The formation of the edge images prior to the horizontal expansion operation is for deleting large black patterns and blacking a bar code area having periodic edges through the horizontal contraction circuit 8. Specifically, decreasing a horizontal run-length of consecutive 1s in the horizontal contraction circuit 8 will cause the large black patterns to disappear, thereby allowing only a skeleton of the bar code area having a greater horizontal black run-length to be extracted. The horizontal expansion circuit 7 is designed to perform substantially the same program as that shown in FIG. 5 except that the image is scanned from top to bottom in units of a horizontal line to increase the horizontal run-length of consecutive is thereof. If a bar pitch is equivalent to ten (10) pixels, n1 is set to 10 pixels to smear the bar code area.

The operation of the horizontal contraction circuit 8 will be described below.

The horizontal contraction circuit 8 performs the function of finding an area having a run-length of consecutive 1s longer than an array of n2 pixels from the image in which the patterns are enlarged horizontally by the horizontal expansion circuit 7 to extract the skeleton of the blacked bar code area.

Figure 6:
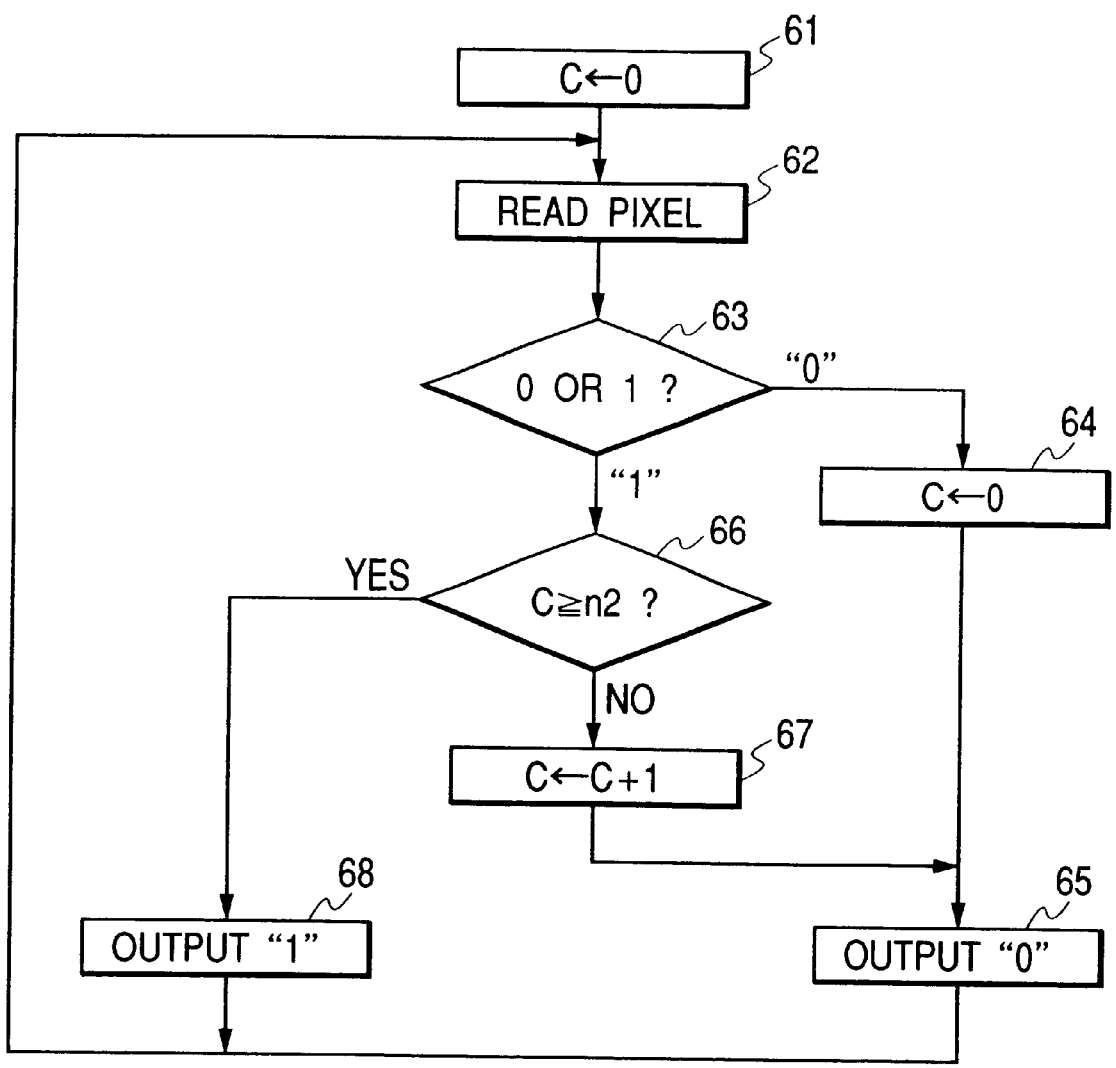
FIG. 6 is a flowchart of a program performed by a horizontal contraction circuit.

FIG. 6 shows a program or sequence of logical steps executed by the horizontal contraction circuit 8 to perform the raster scan of the binary image from top to bottom in units of a horizontal line to decrease a horizontal run-length of consecutive 1s by n2 pixels (e.g., 40 pixels).

After entering the program, the routine proceeds to step 61 wherein a count value C indicating the run-length of consecutive 1s is reset to zero (0) at the start of a scan of each line.

The routine proceeds to step 62 wherein data of a first one of pixels on one of the lines is picked up. The routine proceeds to step 63 wherein it is determined whether the value of the pixel is zero (i.e., a white pixel) or one (i.e., a black pixel). If the value is one, then the routine proceeds to step 66. Alternatively, if the value is zero, then the routine proceeds to step 64 wherein the count value C is reset to zero. The routine proceeds to step 65 wherein zero (0) is outputted as the value of the pixel scanned in this program cycle.

In step 66, it is determined whether the count value C is greater than or equal to n2 or not. If a NO answer is obtained meaning that the count value C is smaller than n2, then the routine proceeds to step 67 wherein the count value C is incremented by one and proceeds to step 65. Alternatively, if a YES answer is obtained, then the routine proceeds to step 68 wherein one (1) is outputted as the value of the pixel scanned in this program cycle. After step 68 or 65, the routine returns back to step 62 to repeat the above described operations until an end of the line is reached, thereby shortening the black run on the line by n2 pixels.

Subsequently, steps 61 to 68 are performed again to shorten a back run on the next line horizontally.

Accordingly, upon completion of scans over the whole of the image, the black run-length of each horizontal line is decreased by n2 pixels, thereby causing background patterns such as characters to be removed from the image, while leaving only the skeleton of the bar code area.

The operation of the identification circuit 9 will be described with reference to FIGS. 7 to 12.

Figure 7:
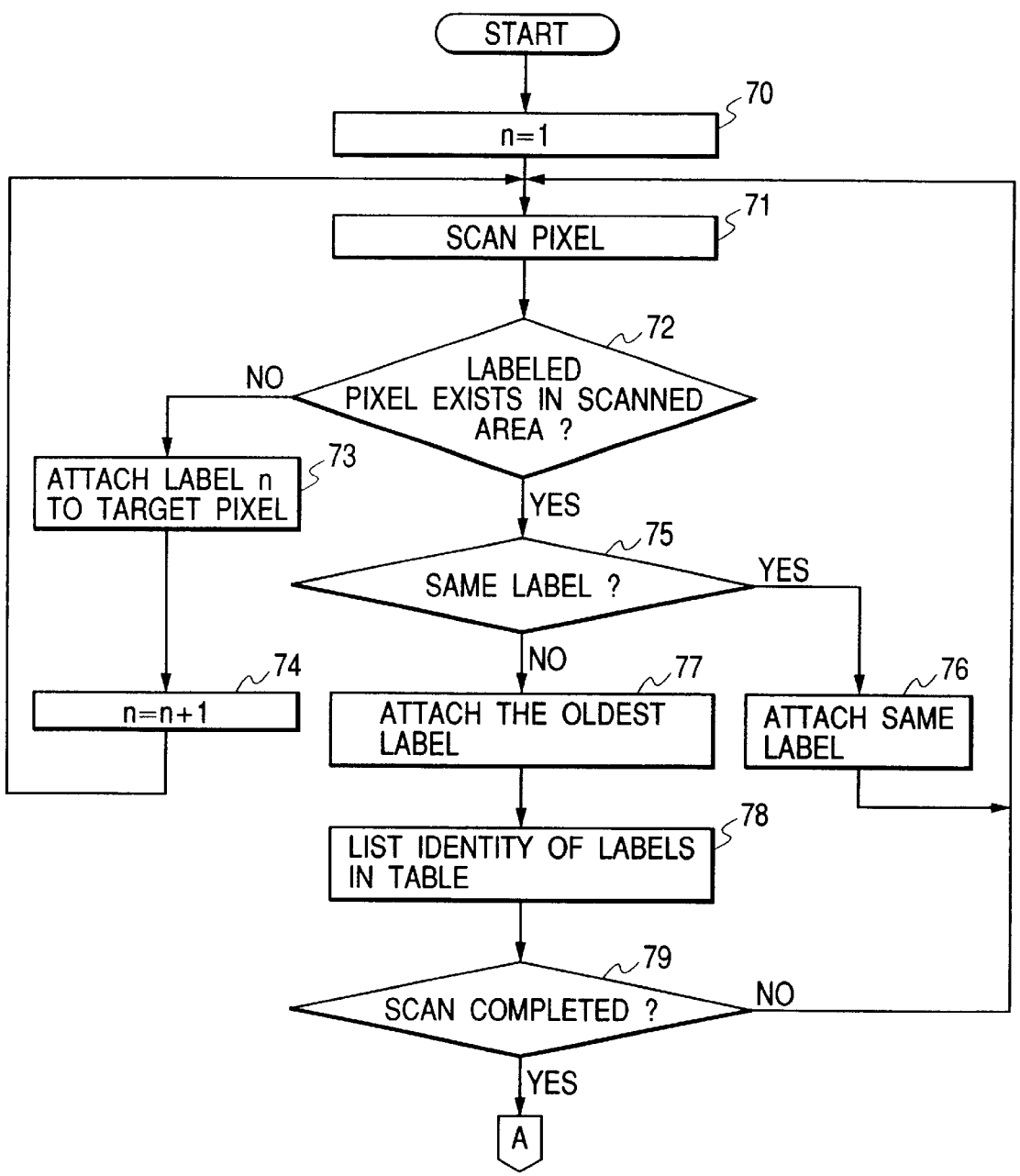
FIG. 7 is a flowchart of a labeling program performed by an identification circuit.

FIG. 7 shows a program to label the image to identify individual patterns.

After entering the program, the routine proceeds to step 70 wherein a label n is set to an initial label number of one (1). The routine proceeds to step 71 wherein a first one of pixels of the image is scanned. The routine proceeds to step 72 wherein a portion of the scanned area neighboring a target pixel, e.g., the pixels d2, d3, d4, and d5 in the window shown in FIG. 3 are monitored to determine whether they have already been labeled or not. If a YES answer is obtained, then the routine proceeds to step 75 wherein the labels of the pixels neighboring the target pixel in the window are identical in label number with each other or not. If a YES answer is obtained, then the routine proceeds to step 76 wherein the same label as that of the neighboring pixels is attached to the target pixel and proceeds to step 79. Alternatively, if a NO answer is obtained in step 75, then the routine proceeds to step 77 wherein the oldest label (i.e., a label having the smallest value) in the scanned area is assigned to the target pixel. The routine proceeds to step 78 wherein the identify of the labels of pixels within the same pattern area is recorded. For instance, if a pattern is forked, and two tines thereof are scanned in a traversing direction in the labeling operation, the two tines are considered to be isolated from each other, so that different labels are attached to them. When a junction of the two tines is reached, it is, however, found that the two tines should have been given the same labels. Information indicating such a condition is recorded in an identification table in step 78. The identification table has data entry rows to which serial label numbers are assigned. In each data entry row, a pattern identification flag, a pattern identification label number, and an area numbers will be listed in steps, as discussed later. For instance, if labels of one (1) are attached to pixels of one of the two tines, and labels of two (2) are attached to pixels of the other tines, the labels of the other tines need to be replaced with the labels of one (1), respectively, because the two tines are, in fact, parts of the single pattern. In this case, a pattern identification flag "on" and a pattern identification label number of one (1) that is a correct label number are listed in one of the data entry rows of the identification table to which the label number of two (2) is assigned to indicate that the tine to which the labels of two (2) are attached should have been given the labels of one (1).

Figure 8:
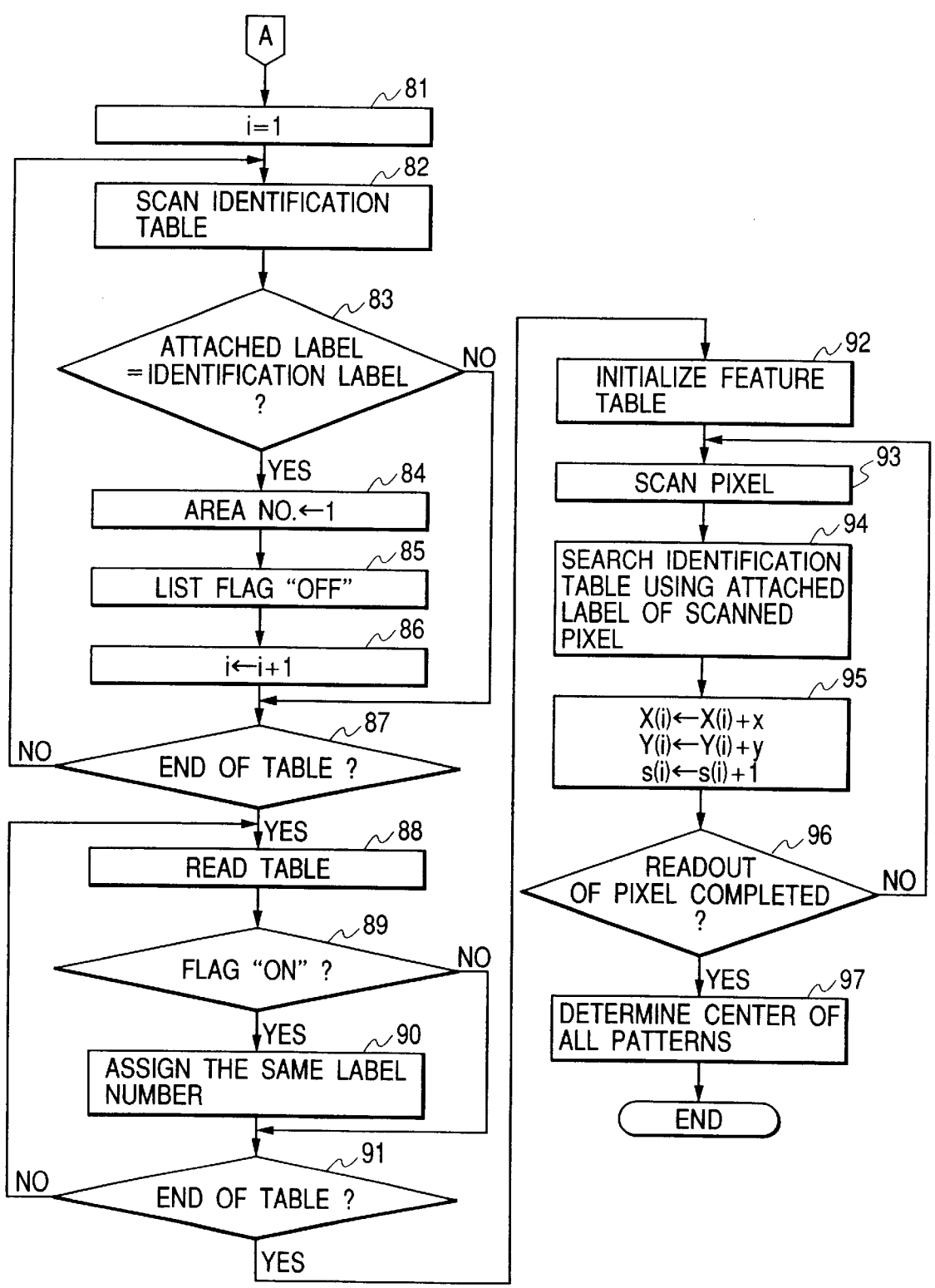
FIG. 8 is a flowchart of a feature extracting operation performed by an identification circuit.

The routine proceeds to step 79 wherein it is determined whether the scan is completed or not. If a YES answer is obtained, then the routine proceeds to a subsequent program, as shown in FIG. 8. Alternatively, if a NO answer is obtained, then the routine returns back to step 71.

If a NO answer is obtained in step 72, then the routine proceeds to step 73 wherein the label n is attached to the target pixel in the scanned area, and the same number as the label n is recorded in a corresponding one of the data entry rows of the identification table as the pattern identification label number. The routine proceeds to step 74 wherein the number of the label n is updated or incremented by one (1) and return back to step 71 to scan a subsequent pixel of the image.

Referring to FIG. 8, steps 81 to 91 are provided for rewriting or completing the identification table. Steps 92 to 97 are provided for finding features of each pattern in the image.

After entering the program, the routine proceeds to step 81 wherein an area number i is reset to one (1). The routine proceeds to step 82 wherein a first one of the data entry rows of the identification table is scanned to look up the label number, the pattern identification flag, and the pattern identification label number listed therein. The routine proceeds to step 83 wherein it is determined whether the label number is identical with the pattern identification label number or not. If a NO answer is obtained, then the routine proceeds directly to step 87. Alternatively, if a YES answer is obtained, then the routine proceeds to step 84 wherein the area number i set in step 81 is recorded in the data entry row of the identification table read in step 82. The routine proceeds to step 85 wherein a pattern identification flag "off" is recorded in the data entry row of the identification table read in step 82. The routine proceeds to step 86 wherein the area number i is incremented by one (1). The routine proceeds to step 87 wherein it is determined whether the data entry row of the identification table scanned in this program cycle is the last one or not. If a NO answer is obtained, then the routine returns back to step 82 to scan the next data entry row of the identification table. Alternatively, if a YES answer is obtained, then the routine proceeds to step 88.

Steps following step 87 are provided for identifying each pattern in the image. In step 88, the first data entry row of the identification table is searched to read the pattern identification flag therein. The routine proceeds to step 89 wherein it is determined whether the pattern identification flag is "on" or not. If a NO answer is obtained meaning that the pattern identification flag "off" is listed in the data entry row read in step 88, then the routine proceeds directly to step 91 wherein it is determined whether the data entry row of the identification table scanned in this program cycle is the last one or not. If a NO answer is obtained, then the routine returns back to step 88 to scan the next data entry row of the identification table. If a YES answer is obtained in step 89, then the routine proceeds to step 90 wherein the same area number as that in an earlier one of the data entry rows of the identification table to which the label number is assigned which is identical with the pattern identification label number listed in the data entry row searched in step 88 is recorded in the data entry row searched in step 88, thereby recording in the identification table information that the pixels to which the labels corresponding to the same pattern identification label numbers in the identification table are attached belong to the same pattern.

The above steps are repeated until the end of the identification table is reached, thereby assigning one of the serial area numbers to all the label numbers attached to the pixels forming the same pattern.

Steps following step 91 are provided for determining features of each pattern in the image.

First, in step 92, parameters listed in each data entry row of a feature table, as shown in FIG. 9, are reset to zero (0). The routine proceeds to step 93 wherein a first one of the pixels of the image is scanned. The routine proceeds to step 94 wherein the same label number as that attached to the pixel scanned in step 93 is searched in the identification table to find a corresponding area number. The routine proceeds to step 95 wherein x and y coordinates of the scanned pixel are added to x and y coordinates X(1) and Y(2) listed in the feature table corresponding to the area number found in step 94, and the pixel number S(i) representing the size of the pattern is incremented by one (1). The routine proceeds to step 96 wherein it is determined whether the last pixel of the image has been scanned or not. If a NO answer is obtained, then the routine returns back to step 93 wherein the second pixel is scanned. Alternatively, if a YES answer is obtained, then the routine proceeds to step 97 wherein the position of the center of each pattern of the image specified by one of the area numbers listed in the feature table is determined as one of features thereof. Specifically, the center of each pattern in the x-axis direction is determined according to the relation of X(i)/s(i) and stored as xg(i) in the feature table. Similarly, the center of each pattern in the y-axis direction is determined according to the relation of Y(i)/s(i) and stored as yg(i) in the feature table. Instead of the size of each pattern as one of the features thereof, a peripheral length or a circumscribed rectangle of each pattern may be used.

With steps 92 to 97, the size (i.e., the pixel number s) and the center or features of each connected pattern in the image inputted to the identification circuit 9 are determined.

Figure 10:
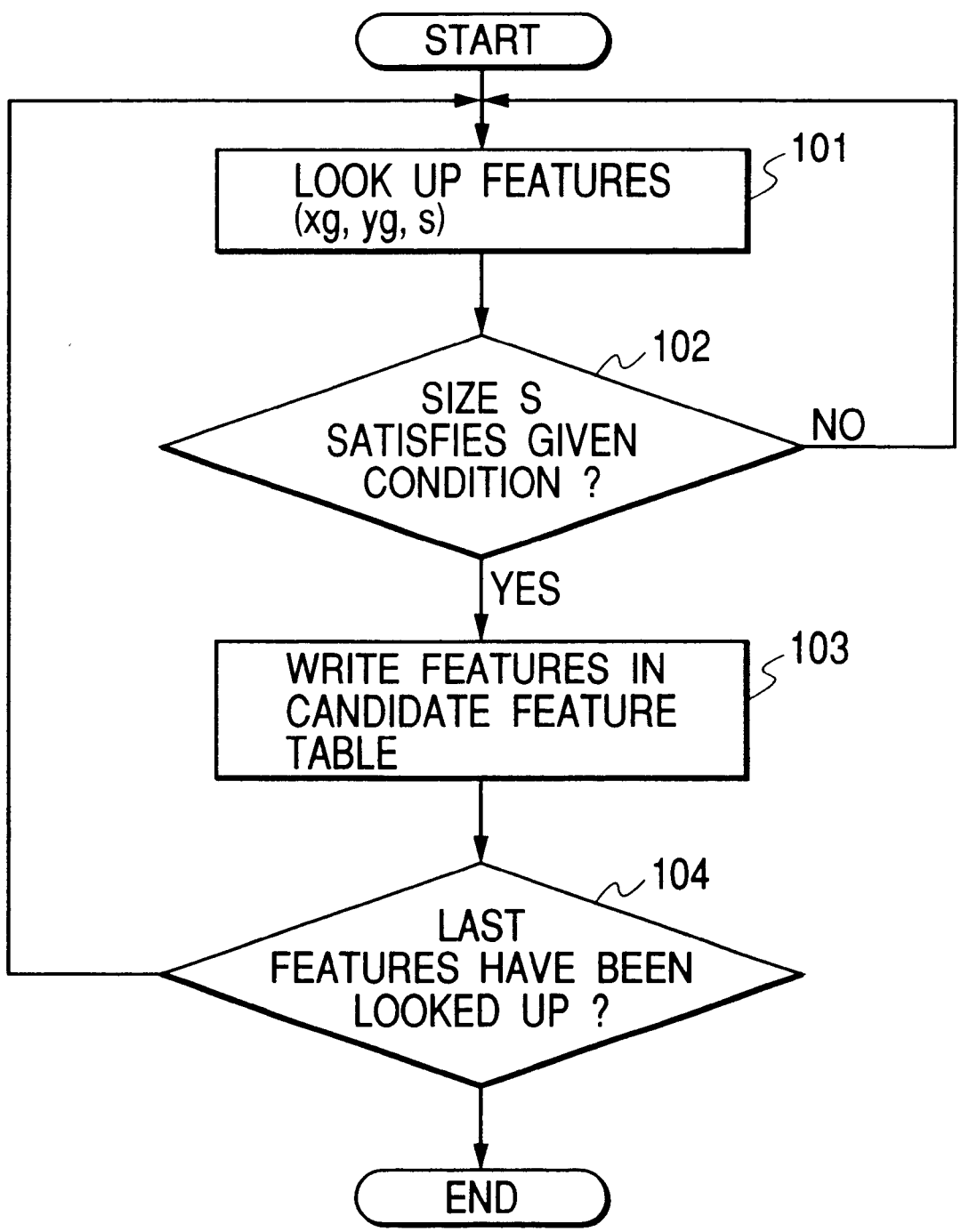
FIG. 10 is a flowchart of a program performed by an identification circuit to determine bar code area candidates.

FIG. 10 shows a program to specify a bar code area candidate.

After entering the program, the routine proceeds to step 101 wherein the features, namely, a set of coordinates xg and yg of the center and the size s of a first one of patterns (also referred to as lands below) of the inputted image listed in a first one of the data entry rows of the feature table to which the area number of one (1) is assigned are looked up.

The routine proceeds to step 102 wherein it is determined whether the size s looked up in step 101 satisfies the following equation:

$$(1-ds1) \cdot H1 \cdot lb \leq s \leq (1+ds1) \cdot H1 \cdot lb$$

where lb is the length of the bar code (i.e., the distance between both ends of the bar code), H1 is the length of the long bars, and ds1 is a constant indicating the tolerance.

If a NO answer is obtained meaning that the land searched in step 101 is not the bar code area candidate, then the routine returns back to step 101 wherein a set of coordinates xg and yg of the center and the size s of the second land in the image are looked up in the feature table. Alternatively, if a YES answer is obtained meaning that the land searched in step 101 is the bar code area candidate, then the routine proceeds to step 103 wherein the features of the land are written into a candidate feature table (not shown) which is similar to the feature table in FIG. 9.

The routine proceeds to step 104 wherein it is determined whether the features of the last land have been looked up in the feature table in step 101 or not. If a NO answer is obtained, then the routine returns back to step 101. Alternatively, if a YES answer is obtained, then the routine terminates.

The operation of the decoder 10 will be described below in detail with reference to FIGS. 11 to 15.

Figure 11:
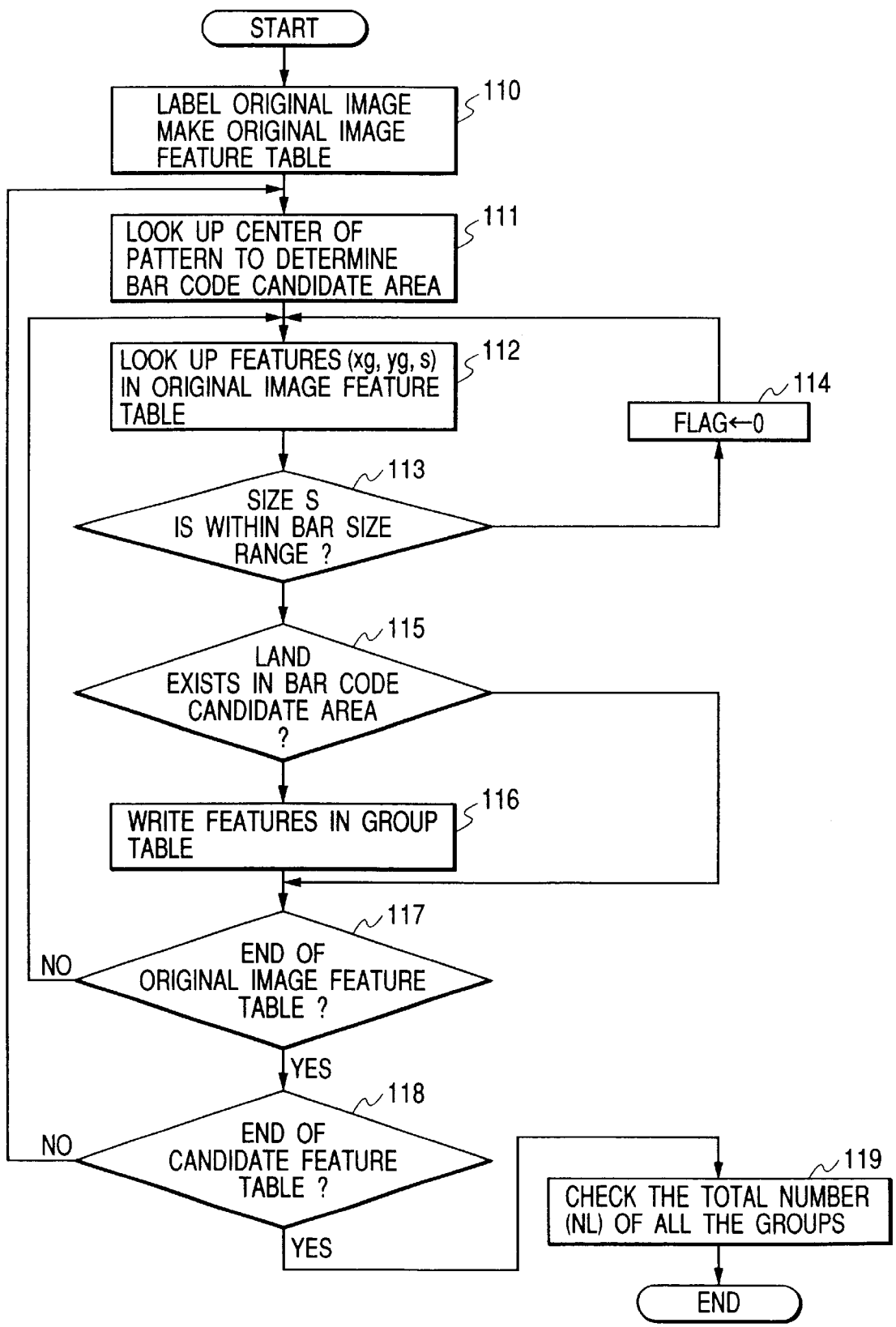
FIG. 11 is a flowchart of a program performed by a decoder to group bars of a bar code.

FIG. 11 shows a program to group bars of the bar code.

First, in step 110, the binary image stored in the image memory 3 is labeled to identify patterns therein in the same manner as that discussed in FIGS. 7 and 8, and the features or a set of coordinates xg and yg of the center and the size s of each pattern or land in the image are determined in the same manner as described above and listed in an original image feature table, as shown in FIG. 12. Flags listed in the original image feature table are all set to one (1) indicating the availability.

The routine proceeds to step 111 wherein the center (xg, yg) of a first one of the lands or bar code area candidates listed in the candidate feature table is looked up to determine a given bar code candidate area defined by a square whose side is equivalent to a given number of pixels (e.g., the length lb of the bar code area) and whose center lies at the central position looked up in the candidate feature table.

Subsequently, the routine proceeds to step 112 wherein in the original image feature table of FIG. 12, the coordinates xg and yg of the center and the size s of a first one of the lands where the flag shows one (1) are looked up.

The routine proceeds to step 113 wherein it is determined whether the size s looked up in step 112 satisfies any one of three relations below or not, that is, whether the size s corresponds to one of sizes of the long bar 21, the semilong bar 22, and the timing bar 23 shown in FIG. 2 or not.

long bar: $(1-t1) \cdot H1 \cdot W1 \leq s \leq (1+t1) \cdot H1 \cdot W1$ semilong bar: $(1-t1) \cdot H2 \cdot W2 \leq s \leq (1+t1) \cdot H2 \cdot W2$ timing bar: $(1-t1) \cdot H3 \cdot W3 \leq s \leq (1+t1) \cdot H3 \cdot W3$ If a NO answer is obtained meaning that the size s does not meet any of the above relations; then the routine proceeds to step 114 wherein the flag in the original image feature table is reset to zero (0) and returns back to step 112 wherein the coordinates xg and yg of the center and the size s of the second land where the flag shows one (1) are looked up in the original image feature table. Alternatively, if a YES answer is obtained, then the routine proceeds to step 115 wherein it is determined whether the land looked up in step 112 exists in the bar code candidate area defined in step 111 or not. If a NO answer is obtained, then the routine proceeds directly to step 117. Alternatively, if a YES answer is obtained meaning that the land exists in the bar code candidate area, then the routine proceeds to step 116 wherein the features of the land are written into a group table gr, as shown in FIG. 13. Specifically, x and y coordinates of the center of the land, the size of the land, and the type of bar are written in x[NL], y[NL], s[NL], and bar[NL] listed in the group table gr. The group table gr has a structure defined in the so-called C language. The total number of lands (NL) listed in a group specified by a serial number j corresponding to the area number of the candidate feature table used in this program cycle is reset to zero (0) at the start of this program. Note that bar[1] denotes the long bar 21, bar[2] denotes the semilong bar 22, and bar[3] denotes the timing bar 23. In step 116, the total number [NL] is incremented by one (1).

The routine proceeds to step 117 wherein the end of the original image feature table shown in FIG. 12 has been reached or not. If a NO answer is obtained, then the routine returns back to step 112 wherein the coordinates xg and yg of the center and the size s of the second land where the flag shows one (1) are looked up in the original image feature table. Alternatively, if a YES answer is obtained, then the routine proceeds to step 118 wherein it is determined whether the end of the candidate feature table has been reached or not. If a NO answer is obtained, then the routine returns back to step 111 wherein the center (xg, yg) of the second bar code area candidate listed in the candidate feature table is looked up to determine a bar code candidate area again. Alternatively, if a YES answer is obtained in step 118, then the routine proceeds to step 119 wherein the total numbers (NL) listed in all the groups j of the group table gr are checked to determine whether data in each group may be considered to define a candidate for the bar code or not. Specifically, it is determined whether the total number (NL) listed in each group is greater than or equal to the total number (N) of the bars of the bar code or not. If a YES answer is obtained, a candidate flag bar_flag is set to one (1) meaning that the data in the group defines a candidate for the bar code. Alternatively, a NO answer is obtained, the candidate flag bar_flag is set to zero (0) meaning that the data in the group does not define a candidate for the bar code.

Figure 14:
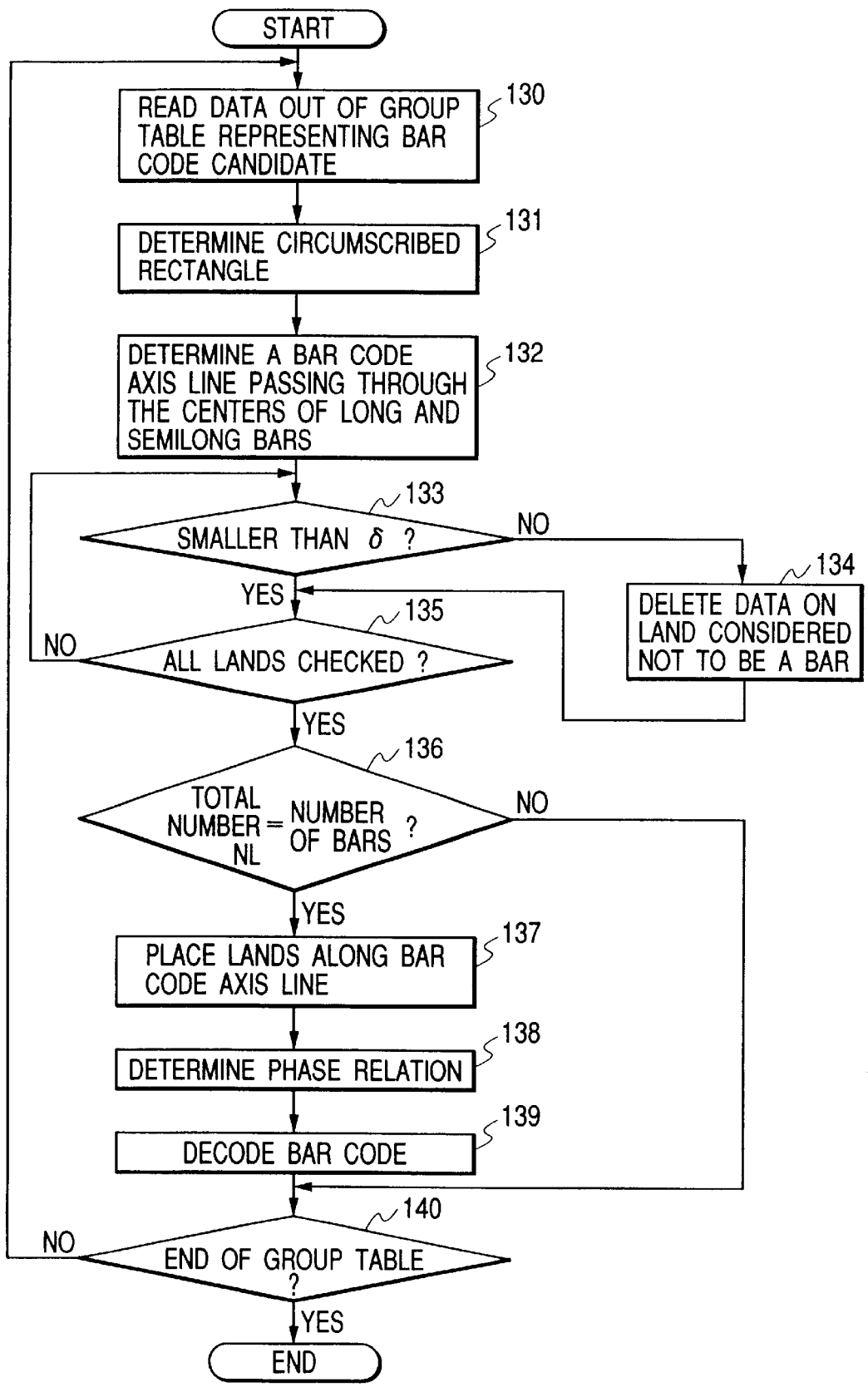
FIG. 14 is a flowchart of a decoding program performed by a decoder.

FIG. 14 shows a program performed by the decoder 10.

After entering the program, the routine proceeds to step 130 wherein the data is read out of a first one of the groups of the group table gr in which the candidate flag bar flag shows one (1).

The routine proceeds to step 131 wherein a circumscribed rectangle is defined which contains all the lands in the group read out in step 130. Specifically, if a maximum and a minimum x coordinate of the centers of all the lands are defined as xmax and xmin, and a maximum and a minimum y coordinates thereof are defined as ymax and ymin, the circumscribed rectangle is defined whose vertexes or corners are designated by four sets of coordinates (xmin, ymin), (xmax, ymin), (xmin, ymax), and (xmax, ymax). If the length of a side of the circumscribed rectangle in the x-axis direction is greater than or equal to the length of a side thereof in the y-axis direction, it means that the angle which a longitudinal center line of the bar code makes with the x-axis is within±45°. Conversely, if the length of the side in the x-axis direction is smaller than the length of the side in the y-axis direction, it means that the angle which the longitudinal center line of the bar code makes with the y-axis is within±45°.

The routine proceeds to step 132 wherein a bar code axis line is determined which passes through the centers of the lands determined in step 113 as the long bar or the semilong bar. If it may be determined that the angle which the longitudinal center line of the bar code makes with the x-axis is within±45°, the bar code axis line is given by an equation of y=a+bx where a and b are expressed as $$b = \frac{n \cdot \sum x \cdot y - \sum x \cdot \sum y}{n \cdot \sum x^2 - (\sum x)^2}$$

$$a = \frac{\sum x^2 \cdot \sum y - \sum x \cdot \sum x \cdot y}{n \cdot \sum x^2 - (\sum x)^2}$$

Alternatively, if it may be determined that the angle which the longitudinal center line of the bar code makes with the y-axis is within±45°, the bar code axis line is given by an equation of x=c+dy where c and d are expressed as $$d = \frac{n \cdot \sum x \cdot y - \sum x \cdot \sum y}{n \cdot \sum y^2 - (\sum y)^2}$$

$$c = \frac{\sum x \cdot \sum y^2 - \sum x \cdot \sum x \cdot y}{n \cdot \sum y^2 - (\sum y)^2}$$

The routine proceeds to step 133 wherein it is determined whether the distance between the bar code axis line and the center of a first one of the lands is smaller than a given value δ or not. If it may be determined that the angle which the longitudinal center line of the bar code makes with the x-axis is within±45°, the distance is given by $$\frac{|y - a - b \cdot x|}{\sqrt{1 + b^2}}$$

Alternatively, if it may be determined that the angle which the longitudinal center line of the bar code makes with the y-axis is within±45°, the distance is given by $$\frac{|x - c - d \cdot y|}{\sqrt{1 + d^2}}$$

If a YES answer is obtained in step 133, then the routine proceeds to step 135. Alternatively, if a NO answer is obtained in step 133 meaning that the land is spaced apart from the bar code axis line and may be considered not to be the bar, then the routine proceeds to step 134 wherein the data (i.e., the x and y coordinates, the size s, and the type of bar) on that land is all deleted from the group table gr, and the total number (NL) is decremented by one (1).

The routine proceeds to step 135 wherein it is determined whether all the lands have been checked or not. If a NO answer is obtained, then the routine returns back to step 133 wherein it is determined whether the distance between the bar code axis line and the center of the second land is smaller than the given value δ or not. Alternatively, if a YES answer is obtained, then the routine proceeds to step 136 wherein it is determined whether the total number (NL) is equal to the total number of the bars of the bar code or not. If a NO answer is obtained meaning that the data in the group read out in this program cycle is not data on the bar code, then the routine proceeds to step 140. Alternatively, if a YES answer is obtained, then the routine proceeds to step 137 wherein the lands are placed along the bar code axis line for facilitating a subsequent decoding operation. Specifically, if it may be determined that the angle which the longitudinal center line of the bar code makes with the x-axis is within±45°, the x coordinates of all the lands are sought. Alternatively, if it may be determined that the angle which the longitudinal center line of the bar code makes with the y-axis is within±45°, the y coordinates of all the lands are sought.

The routine proceeds to step 138 wherein a phase relation between each semilong bar and the bar code axis line is determined. This determination will be described, taking an example shown in FIG. 15.

Figure 15:
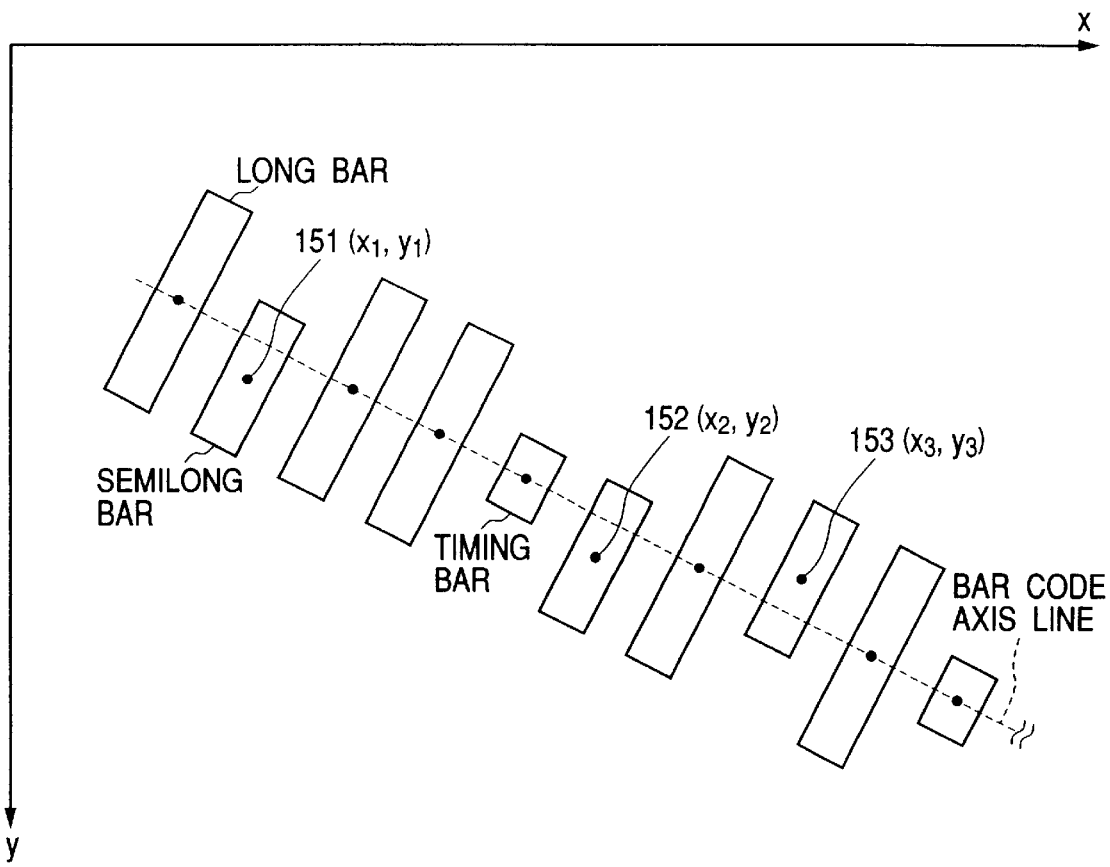
FIG. 15 is an illustration for explanation of a manner to determine a phase ration between semilong bar and a bar code axis line passing through a bar code.

FIG. 15 illustrates for the case where the angle which the longitudinal center line of the bar code makes with the x-axis is within±45°. Assuming that x and y coordinates of the centers of the semilong bars 151, 152, and 153 are $(x_1, y_1)$, $(x_2, y_2)$, and $(X_3, y_3)$, respectively, it is determined whether the semilong bars 151, 152, and 153 lie on a positive side (i.e., a lower side, as viewed in the drawing) or a negative side (i.e., an upper side) of the bar code axis line. In this case, conditions of $y_1 < a+b \cdot x_1$, of $y_2 < a+b \cdot x_2$, and $y_3 > a+b \cdot x_3$ are met, therefore, it is found that the semilong bars 151 and 152 are located on the positive side of the bar code axis line, while the semilong bar 153 is located on the negative side of the bar code axis line.

The routine proceeds to step 139 wherein the data on all the lands in the group scanned in this program cycle are read out in sequence to decode the bar code based on the type of bar and the phase relation derived in step 138 using a known code conversion table (not shown). The routine proceeds to step 140 wherein it is determined whether all the groups of the group table gr have been checked or not. If a YES answer is obtained, then the routine terminates. Alternatively, if a NO answer is obtained, then the routine returns back to step 130 to read data out of the next group of the groups of the group table grin which the candidate flag bar_flag shows one (1).

Figure 16:
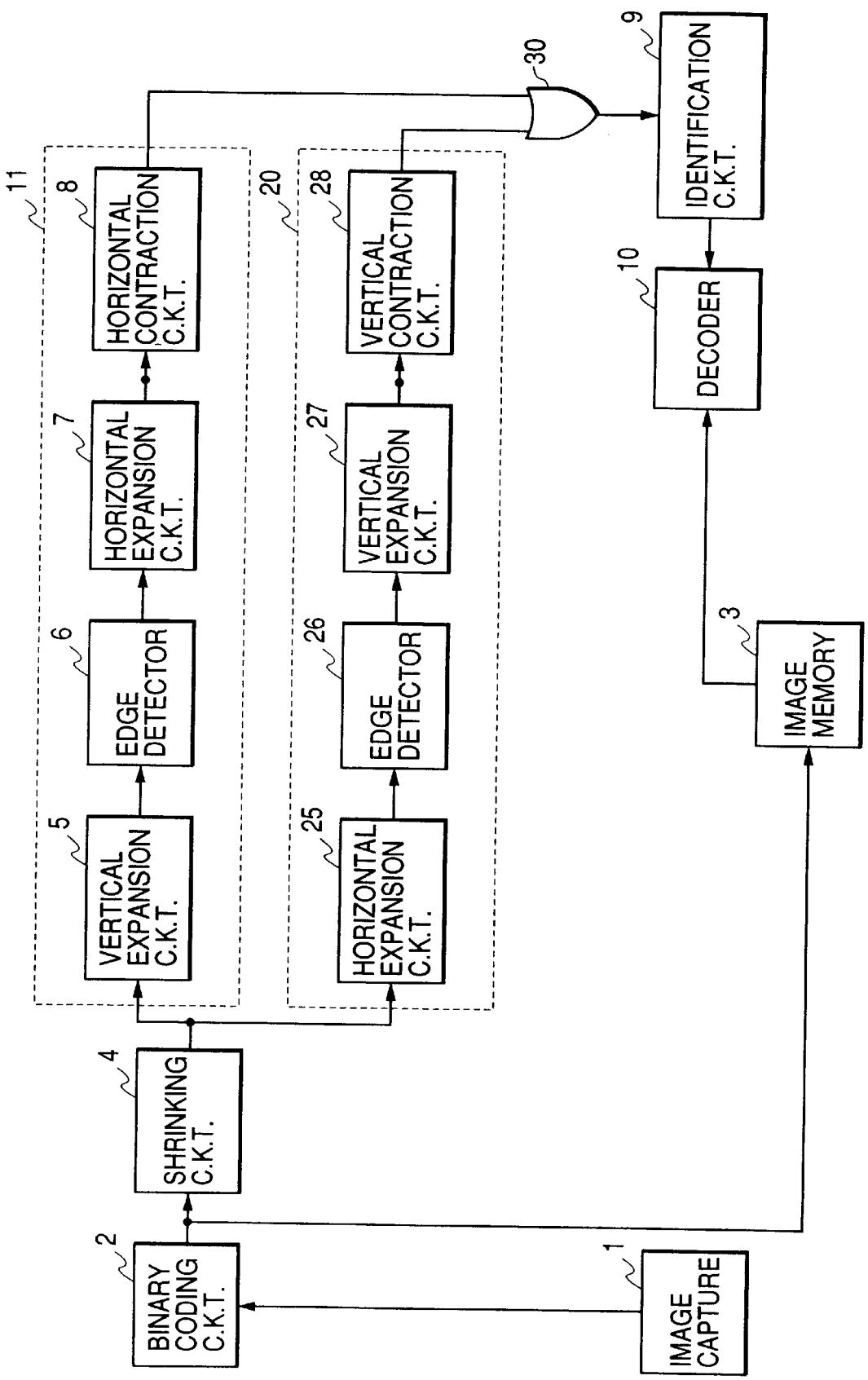
FIG. 16 is a block diagram which shows a bar code reader according to the second embodiment of the invention.
Figure 17:
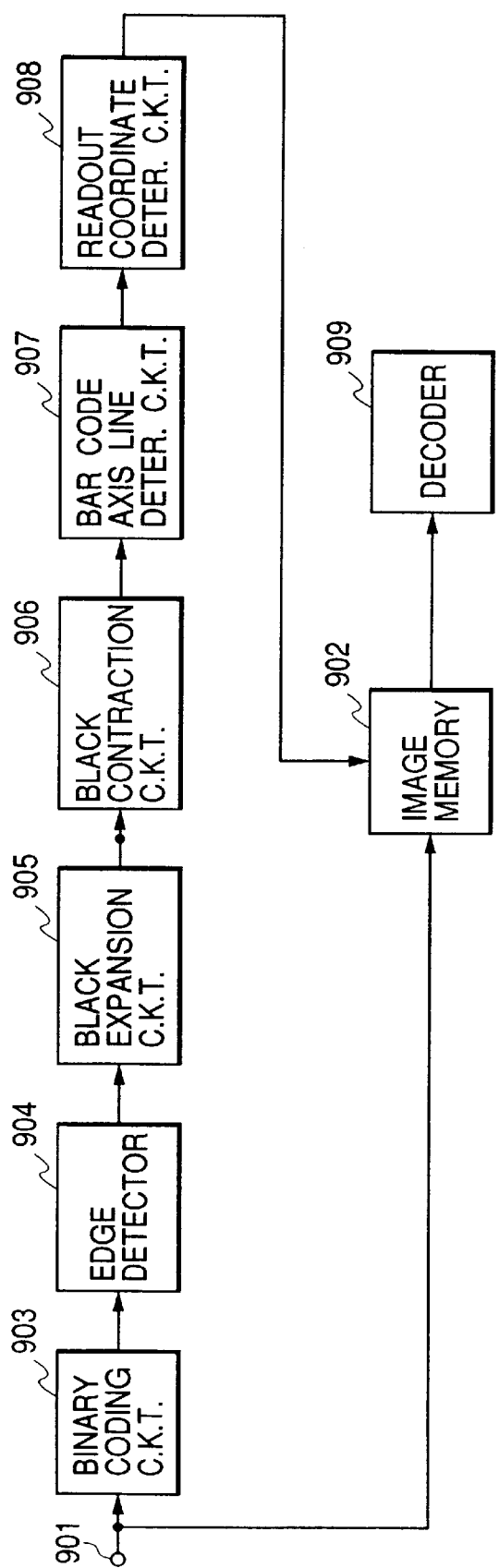
FIG. 17 is a block diagram which shows a conventional bar code reader.

FIG. 16 shows a bar code reader according to the second embodiment of the invention.

The bar code reader of this embodiment is different from that of the first embodiment shown in FIG. 1 in that a vertical extraction circuit 20 and an OR circuit 30 are provided. Other arrangements are identical, and explanation thereof in detail will be omitted here.

The vertical extraction circuit 20 consists of a horizontal expansion circuit 25, an edge detector 26, a vertical expansion circuit 27, and a vertical contraction circuit 28. The horizontal expansion circuit 25 expands a pattern in a binary image outputted from the shrinking circuit 4 horizontally by m pixels. The edge detector 26 detects an edge or contour of the pattern in the image. The vertical expansion circuit 27 expands the pattern in the image vertically by n1 pixels. The vertical contraction circuit 28 contracts the pattern vertically by n2 pixels. The horizontal expansion circuit 25, the vertical expansion circuit 27, and the vertical contraction circuit 28 are identical in operation with the vertical expansion circuit 5, the horizontal expansion circuit 7, and the horizontal contraction circuit 8 except for the directions of the expansion and shrinking operations, and explanation thereof in detail will be omitted here.

An output signal of the horizontal contraction circuit 8 represents the skeleton of a bar code area skewed horizontally in an image picked up by the image capture 1, while an output signal of the vertical contraction circuit 28 represents the skeleton of a bar code area skewed vertically in the captured image. An output of the OR circuit 30, therefore, indicates either of the horizontally skewed car code and the vertically skewed bar code, thereby allowing the decoder 10 to decode the bar code contained in the captured image correctly regardless of the orientation thereof.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A bar code reader comprising:

an image capturing device capturing an image containing a bar code;

a binary coding circuit transforming the image captured by said image capturing device into a binary image in which a background is expressed in a binary 0, and each pattern is expressed in a binary 1;

an image storage storing therein the binary image produced by said binary coding circuit;

a shrinking circuit shrinking each pattern in a binary image outputted from said binary coding circuit by k pixels (k is a positive integral number) from a background side;

a vertical expansion circuit expanding each pattern in a binary image outputted from said shrinking circuit vertically by m pixel (m is a positive integral number);

an edge detector detecting a contour of each pattern in a binary image outputted from said vertical expansion circuit to produce a binary image containing an edge of each pattern in the inputted binary image;

a horizontal expansion circuit expanding each pattern in the binary image outputted from said edge detector horizontally by n1 pixel (n1 is a positive integral number);

a horizontal contraction circuit contracting each pattern in a binary image outputted from said horizontal expansion circuit horizontally by n2 (n2 is a positive integral number);

an identification circuit labeling patterns in a binary image outputted from said horizontal contraction circuit to identify the patterns, said identification circuit specifying a bar code area based on shape characteristics of the patterns; and a decoder selecting data on the binary image stored in said image storage which belongs in the bar code area specified by said identification circuit to decode the bar code in the image captured by said image capturing device.

2. A bar code reader as set forth in claim 1, further comprising:

a horizontal expansion circuit expanding each pattern in the binary image outputted from said shrinking circuit horizontally by the m pixel;

an edge detector detecting a contour of each pattern in a binary image outputted from said horizontal expansion circuit to produce a binary image containing an edge of each pattern in the inputted binary image;

a vertical expansion circuit expanding each pattern in the binary image outputted from said edge detector vertically by the n1 pixel;

a vertical contraction circuit contracting each pattern in a binary image outputted from said vertical expansion circuit vertically by the n2; and an OR circuit logically oring outputs from said horizontal contraction circuit and said vertical contraction circuit to provide an output to said identification circuit.

3. A bar code reader as set forth in claim 2, wherein said identification circuit determines one of a size, a peripheral length, and a circumscribed rectangle of each pattern in the image inputted from one of said horizontal contraction circuit and said vertical contraction circuit through said OR circuit as a feature of each pattern and specifies the bar code area based on the features of the patterns.

4. A bar code reader as set forth in claim 2, wherein the bar code contained in the image captured by said image capturing device is a four-state bar code made up of a combination of long bars, semilong bars, and timing bars, and wherein said identification circuit identifies each pattern in the binary image inputted from one of said horizontal contraction circuit and said vertical contraction circuit through the OR circuit as one of the long bar, the semilong bar, and the timing bar, determines a line passing through centers of the patterns identified as the semilong bar, determines whether a center of each of the patterns identified as the semilong bar lies on a first side of the line or a second side opposed to the first side to find a positional relation between each of the patterns identified as the semilong bar and the line, and decodes the bar code using the positional relation.

5. A bar code reader as set forth in claim 1, wherein said identification circuit determines one of a size, a peripheral length, and a circumscribed rectangle of each pattern in the image outputted from said horizontal contraction circuit as a feature of each pattern and specifies the bar code area based on the features of the patterns.

6. A bar code reader as set forth in claim 1, wherein the bar code contained in the image captured by said image capturing device is a four-state bar code made up of a combination of long bars, semilong bars, and timing bars, and wherein said identification circuit identifies each pattern in the binary image outputted from said horizontal contraction circuit as one of the long bar, the semilong bar, and the timing bar, determines a line passing through centers of the patterns identified as the semilong bar, determines whether a center of each of the patterns identified as the semilong bar lies on a first side of the line or a second side opposed to the first side to find a positional relation between each of the patterns identified as the semilong bar and the line, and decodes the bar code using the positional relation.

* * * * *